US006975623B2

(12) United States Patent
Nelson et al.

(10) Patent No.: US 6,975,623 B2
(45) Date of Patent: *Dec. 13, 2005

(54) INTERCONNECTION ARCHITECTURE FOR MANAGING MULTIPLE LOW BANDWIDTH CONNECTIONS OVER A HIGH BANDWIDTH LINK

(75) Inventors: Jeffrey J. Nelson, Louisville, CO (US); Gary R. Flauaus, Broomfield, CO (US); Daniel F. Casper, Poughkeepsie, NY (US); Joseph C. Elliott, North Creek, NY (US); Catherine C. Huang, Poughkeepsie, NY (US); John R. Flanagan, Poughkeepsie, NY (US); Louis W. Ricci, Hyde Park, NY (US)

(73) Assignee: McDATA Corporation, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/798,818

(22) Filed: Mar. 10, 2004

(65) Prior Publication Data

US 2004/0174867 A1   Sep. 9, 2004

Related U.S. Application Data

(62) Division of application No. 09/502,947, filed on Feb. 11, 2000, now Pat. No. 6,728,803.

(60) Provisional application No. 60/126,825, filed on Mar. 30, 1999.

(51) Int. Cl.[7] .............................................. H04L 12/66
(52) U.S. Cl. ...................................... 370/352; 370/401
(58) Field of Search ................................ 370/352, 353, 370/355, 356, 401, 466

(56) References Cited

U.S. PATENT DOCUMENTS

| 5,099,473 | A |   | 3/1992  | Gupta             |           |
|-----------|---|---|---------|-------------------|-----------|
| 5,251,210 | A |   | 10/1993 | Mann et al.       |           |
| 5,521,915 | A | * | 5/1996  | Dieudonne et al.  | 370/395.3 |
| 5,608,446 | A |   | 3/1997  | Carr et al.       |           |
| 5,712,850 | A |   | 1/1998  | Elia et al.       |           |
| 5,761,464 | A |   | 6/1998  | Hopkins           |           |
| 5,781,547 | A |   | 7/1998  | Wilson            |           |

(Continued)

FOREIGN PATENT DOCUMENTS

EP   0436293   7/1991

(Continued)

OTHER PUBLICATIONS

Microsoft Press Computer Dictionary, 4th Edition update, Definition of "Meta Data", retrieved via the Internet Jan. 26, 2005.*

(Continued)

*Primary Examiner*—Melvin Marcelo
(74) *Attorney, Agent, or Firm*—Hensley Kim & Edgington LLC (57) ABSTRACT

A data communication architecture including a plurality of devices having input/output (I/O) ports supporting communication at a first rate and a data processor having a number of I/O ports where each I/O port supports data communication at a second data rate. The second data rate is at least double the first data rate. A communication link coupled to one of the data processor I/O ports supports the second data rate. A bridge device is coupled to the communication link and to the I/O ports of the plurality of devices. The bridge device translates the communication link at the second data rate to a plurality of communication links at the first data rate, where the plurality of communication links at the first data rate are substantially independent of each other.

9 Claims, 6 Drawing Sheets

U.S. PATENT DOCUMENTS

| | | | |
|---|---|---|---|
| 5,819,045 A | 10/1998 | Raman et al. | |
| 5,909,686 A | 6/1999 | Muller et al. | |
| 5,930,250 A | 7/1999 | Klok et al. | |
| 6,002,692 A | 12/1999 | Wills | |
| 6,128,294 A | 10/2000 | Oura et al. | |
| 6,128,296 A | 10/2000 | Daruwalla et al. | |
| 6,145,024 A | 11/2000 | Maezawa et al. | |
| 6,181,702 B1 | 1/2001 | Egbert | |
| 6,539,027 B1 | 3/2003 | Cambron | |
| 6,628,617 B1 * | 9/2003 | Karol et al. | 370/237 |
| 6,728,803 B1 * | 4/2004 | Nelson et al. | 710/60 |
| 6,832,254 B1 * | 12/2004 | Scoggins et al. | 709/227 |

FOREIGN PATENT DOCUMENTS

| | | |
|---|---|---|
| EP | 0844803 | 5/1998 |
| FR | 2758037 | 7/1998 |
| JP | A-63-115498 | 5/1988 |
| JP | A-10-340243 | 12/1998 |

OTHER PUBLICATIONS

European Patent Office, Supplementary Partial European Search Report, Sep. 24, 2004, pp. 1-3, Munich, Germany.

* cited by examiner

INTERCONNECTION ARCHITECTURE FOR MANAGING MULTIPLE LOW BANDWIDTH CONNECTIONS OVER A HIGH BANDWIDTH LINK

RELATED APPLICATIONS

This application is a Divisional Application of U.S. patent application Ser. No. 09/502,947 filed Feb. 11, 2000 now U.S. Pat. No. 6,728,803 entitled INTERCONNECTION ARCHITECTURE FOR MANAGING MULTIPLE LOW BANDWIDTH CONNECTIONS OVER A HIGH BANDWIDTH LINK, which claims the benefit under 35 U.S.C. §120 of U.S. Provisional Patent Application 60/126,825 filed Mar. 30, 1999 of the same title, both applications being incorporated by reference herein in their entirety.

BACKGROUND OF THE INVENTION

1. Field of the Invention

The present invention relates, in general, to data communication, and, more particularly, to a system, method and architecture for managing multiple low bandwidth connections over a single higher bandwidth communication channel.

2. Relevant Background

Enterprise computing networks are formed by a geographically distributed collection of computing resources that are linked by high speed communication channels. Typically, one or more mainframe computers are used to supply bulk data processing while other nodes are used for specialized functions. An example is a storage area network (SAN) in which mass storage is implemented in a "storage farm" that is coupled to the mainframe processors by a communication channel or network.

As used herein, a communication "channel" provides direct or switched point-to-point connection between communicating devices. A circuit switched channel is typically hardware intensive and transports data at high speed with little overhead required for channel management. Circuit switched connections usually remain established even if no data is being transferred, thus bandwidth is wasted, yet may support multiple users through multiplexing techniques such as time division multiplexing.

Packet switched networks on the other hand allow users to dynamically share the network medium and available bandwidth using variable-length packets. Packet switched networks are characterized by more efficient and flexible data transfer as compared to circuit switched communication. Packet switched communications increases the overhead by adding addressing information to each packet that enables the packet to be switched between various network components until the destination is reached.

Early efforts to implement high bandwidth long distance communication used switched circuit technology. A widely used example of such technology is the single-byte command code sets connection (SBCON) architecture. SBCON is standardized by American National Standards Institute (ANSI) standard X3.296-1997 entitled "Information Technology—Single-Byte Command Code Sets CONnection (SBCON) Architecture". ANSI document X3.296-1997 describes an input/output (I/O) and interconnection architecture that specifies fiber optic links, switched point-to-point topology, and I/O protocols for high bandwidth, high performance and long distance information exchange. As used herein, SBCON refers to standard SBCON architecture as well as variants of SBCON such as the enterprise system connection (ESCON) architecture offered by IBM, and the like. For purposes of the present invention these variants are considered equivalent to SBCON.

SBCON supports a maximum of 200 Mbit/second full duplex channels. SBCON has been widely deployed to support communication between mainframes and storage devices or other peripheral components in a distributed architecture. Hence, there exists a significant installed base of SBCON applications and devices. However, the rapid advances of communications and data processing and storage technology have made many SBCON installations non-optimal.

Distributed computing environments in general and SAN applications in particular require increasingly higher speed communications links between devices. Conventional mainframe architectures support an operating system defined, system limited number of connection ports (e.g., 256) for connections between the mainframe and other devices. Performance improvements in data processing speeds have spawned increasingly data-intensive and speed-sensitive applications. As the demands for data transfer have increased, the 200 Mbit/second per channel limitation of prior communication technology is limiting. As the mainframe operating system cannot be readily changed to provide more ports, the only solution for increased data transfer is to increase the bandwidth of each channel.

Fibre channel has been developed as a extensible, flexible data communication architecture for high bandwidth data transfer between workstations, mainframes, supercomputers, storage devices, and other peripherals. Fibre channel operates at a variety of speeds ranging from 256 Mbits/second (bi-directional) to 2 Gbits/second (bi-directional) with speeds of up to 4 Gbit/second contemplated. Standards are defined for both copper and optical communication media. Fibre channel combines desirable features of both packet switched and circuit switched communication. Fibre channel uses an active, intelligent interconnection architecture that called a "fabric" to connect devices. While the physical implementation of Fibre channel is packet switched, a fabric supports varying classes of service, including dedicated virtual connections between nodes, to ensure efficient transmission of different types of traffic.

The fabric provides a number of ports, called F_Ports, that enable devices to access the fabric. Devices couple to an F_Port using a node port (N_Port) implemented within or associated with the device. To connect to a fibre channel fabric devices include a node port or "N_Port" that manages the fabric connection. The N_port establishes a connection to a fabric element (e.g., a switch) having a fabric port or F_port. Devices attached to the fabric require only enough intelligence to manage the connection between the N_Port and the F_Port. Fabric elements include the intelligence to handle routing, error detection and recovery, and similar management functions.

A switch is a device having multiple F_Ports where each F_Port manages a simple point-to-point connection between itself and it's attached system. Each F_Port can be attached to a server, peripheral, I/O subsystem, or bridge. A switch receives a connection request from one port and automatically establishes a connection to another port based on address information contained in the request. Multiple calls or data transfers happen concurrently through the multi-port fibre channel switch. A key advantage of switched technology is that it is "non-blocking" in that once a connection is established through the switch, the bandwidth provided by that connection is not shared. Hence, the physical connection resources such as copper wiring or fiber optic cabling can be more efficiently managed by allowing multiple users to access the physical connection resources as needed.

Although fibre channel offers much higher bandwidth connection technology, the large installed base of legacy circuit switched systems such as SBCON devices cannot directly connect to a fibre channel fabric. While it is feasible to offer a fibre channel port to a mainframe computer in a network, there may be many hundreds of node devices that would need to be upgraded or replaced interface with the fabric. As a result, migration to higher speed technology afforded by fibre channel has been slow and too expensive to implement in some instances.

Efforts have been made to encapsulate or embed SBCON and ESCON traffic in fibre channel packets. These solutions make SBCON traffic compatible with fibre channel communication media. However, so long as the high bandwidth fibre is supplying data to an SBCON device, the fibre channel communication link can only operate at an effective data rate equal to what the SBCON device accepts. Hence, much of the benefit of fibre channel is wasted when accessing legacy SBCON or ESCON devices. Accordingly, there is a need for a connection architecture that enables a high speed communication link such as fibre channel to carry low bandwidth connections in an efficient manner.

SUMMARY OF THE INVENTION

Briefly stated, the present invention involves a bridge circuit for a communication link having a packet switched side supporting a full duplex packet switched link and a circuit switched side supporting a number of full duplex circuit switched links. A binding mechanism within the bridge circuit maintains a data structure for storing a logical binding description. The logical binding description binds packet switched frames to a particular one of the circuit switched links.

The present invention also involves a data communication architecture including a plurality of devices having input/output (I/O) ports supporting communication at a first rate and a data processor having a number of I/O ports where each I/O port supports data communication at a second data rate. The second data rate is at least double the first data rate. A communication link coupled to one of the data processor I/O ports supports the second data rate. A bridge device is coupled to the communication link and to the I/O ports of the plurality of devices. The bridge device translates the communication link at the second data rate to a plurality of communication links at the first data rate, where the plurality of communication links at the first data rate are substantially independent of each other (i.e., the first data rate links are not required to share control, signaling, or data information).

In another aspect, the present invention involves method for operating a communication link with a bridge unit supporting a high bandwidth connection and a plurality of low bandwidth connections. Operability of the low bandwidth connections is verified and an exchange credit value is determined based on the number of operable low bandwidth connections. A message including the credit value is issued on the high bandwidth connection. Any device coupled to the high bandwidth connection is required to have at least one exchange credit before communications will be accepted by the bridge unit on the high bandwidth connection from that device.

DETAILED DESCRIPTION OF THE PREFERRED EMBODIMENTS

The present invention is directed to a data communication architecture useful for efficiently communicating with low bandwidth devices using a high bandwidth data communication link. The invention is described in terms of specific embodiments in which a fibre channel link is used to transport data between a mainframe computer and a plurality of single-byte command channel command set connection (SBCON) shared peripheral devices such as storage devices and printers. However, this specific example is readily extended to more general data communication applications where, for whatever reason, it is desired to connect low bandwidth devices to a high bandwidth communication link. The present invention is particularly useful in environments where the low bandwidth devices support a circuit switched type communication channel and the high bandwidth link supports a packet switched technology, but other applications will be readily apparent.

Figure 1:
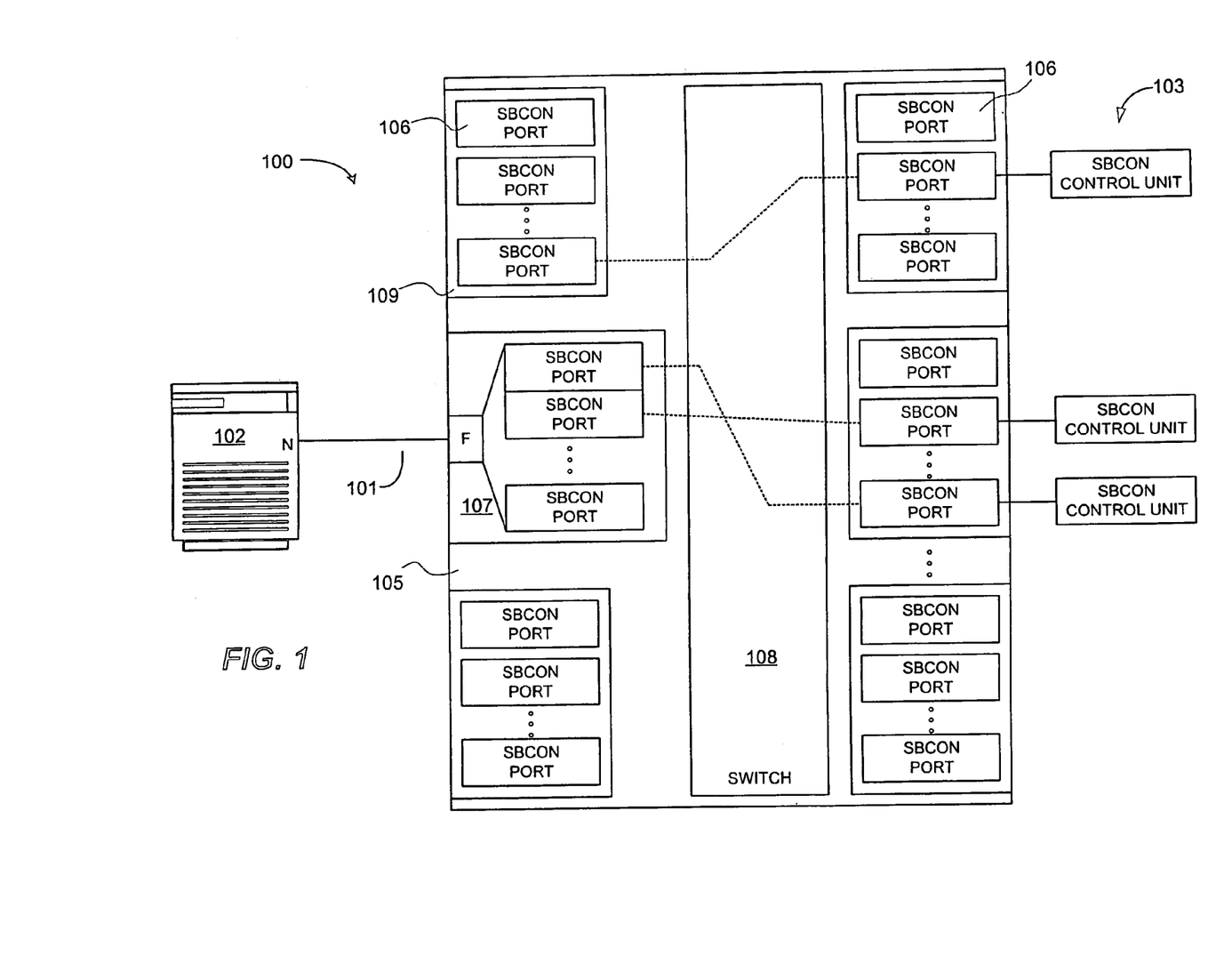
FIG. 1 shows a distributed computing environment in which the mechanisms and methods in accordance with the present invention are implemented.

FIG. 1 illustrates a simplified distributed computing environment 100 in which the present invention is usefully employed. Environment 100 enables a mainframe computer 102 to interact with, among other things, selected SBCON devices 103 through a director 105. Although only one mainframe or "host" 102 is shown, a typical environment may include multiple hosts where each host can have FC links and/or SBCON links connected to one or more directors 105.

Computing environment 100 also includes a plurality of devices such as SBCON control unit 103 that are coupled to one (or more) directors 105 by, for example, fiber optic cables. Director 105 is able to dynamically connect pairs of its ports 106, labeled SBCON ports in the specific example of FIG. 1. The dynamic nature of these connections through switch 108 is suggested by the dashed line connections in FIG. 1. Each individual port 106 is capable of 1 connection at any given time.

In a specific implementation director 105 is provided with a number of expansion slots into which port cards 109 can be plugged in. Each port card comprises circuitry and devices to implement a group of ports 106 (e.g., eight). In this manner, director 105 can be expanded by plugging in additional ports 106 as needed.

In the specific embodiment of FIG. 1, one or more bridge devices 107 are coupled to director 105 by, for example, plugging into one of the expansion slot. Bridge device 107 is configured with a compatible interface to the expansion slot of director 105. Ideally, director 105 cannot distinguish the SBCON ports 106 provided by port control 107 from other, conventional SBCON ports 106. Unlike conventional port cards, however, bridge device 107 provides an F_port interface to a fibre channel link 101. In the particular example, one F_Port supports eight SBCON ports.

Fibre channel (FC) link 101 is implemented using fibre channel compliant hardware and software such as copper or fiber optic physical connection technology or any available equivalent. Link 101 comprises a point-to-point or virtual point-to-point link between a node port (N_Port) labeled "N" in FIG. 1 and a fabric port (F_Port) labeled with an "F" in FIG. 1. Although a single FC link 101 is illustrated, it is contemplated that in a typical system any number of the available ports in mainframe 102 may use the present invention to connect to a bridge device 107.

Mainframe 102 comprises a high speed data processing machine and may be implemented as a single processor or multi-processor device. Mainframe 102 includes memory devices accessible by the processors for data manipulation and software instruction execution. Mainframe 102 includes local mass storage, input/output (I/O) devices, and other available devices and peripherals to aid in data execution needs of a particular application. A portion of the computer program product devices in accordance with the present invention are stored in memory and mass storage associated with mainframe 102 and are executed on processors within mainframe 102. Mainframe 102 can be implemented using any commercially available or special purpose computer components and technology.

SBCON control units 103 each comprise one or more shared peripheral devices such as printers, mass storage devices, magnetic disk drives, optical disk storage, tape storage, and the like. It should be understood that control units 103 could be replaced with any type of peripheral device in a distributed computing environment 100.

Bridge unit 107 supports a full duplex communication link operating at a minimum of 200 Mbits/sec. and up to 1 Gbit/sec. or higher depending on the available components. Each of the SBCON channels ports 106 support a 200 Mbit/sec. duplex channel in the particular example. Essentially, port control 107 functions as a multiplexer/demultiplexer (MUX/DEMUX) unit to combine the eight 200 Mbit/sec. channels for transmission on a 1 Gbit/sec. link.

In accordance with the present invention, bridge unit 107 supports the circuit switched requirements of the SBCON interface and a packet switched connection with mainframe 102. Any available mechanisms and circuits may be used to implement FC-0 through FC-1 transmission and signaling protocols as defined by the FC-PH specification. The present invention implements an exchange binding between packets from mainframe 102 and individual circuits on the circuit switched side of port control 107. The exchange binding in accordance with the present invention enables mainframe 102 and each SBCON control unit 103 to maintain state information about each particular communication exchange. This state information enables messages generated by mainframe 102 to be paired with responses generated by an SBCON control unit 103 and vice versa. In this manner, the comparatively high speed fibre channel communication link can be multiplexed and used efficiently to support multiple low bandwidth (e.g., SBCON) channels.

Figure 2:
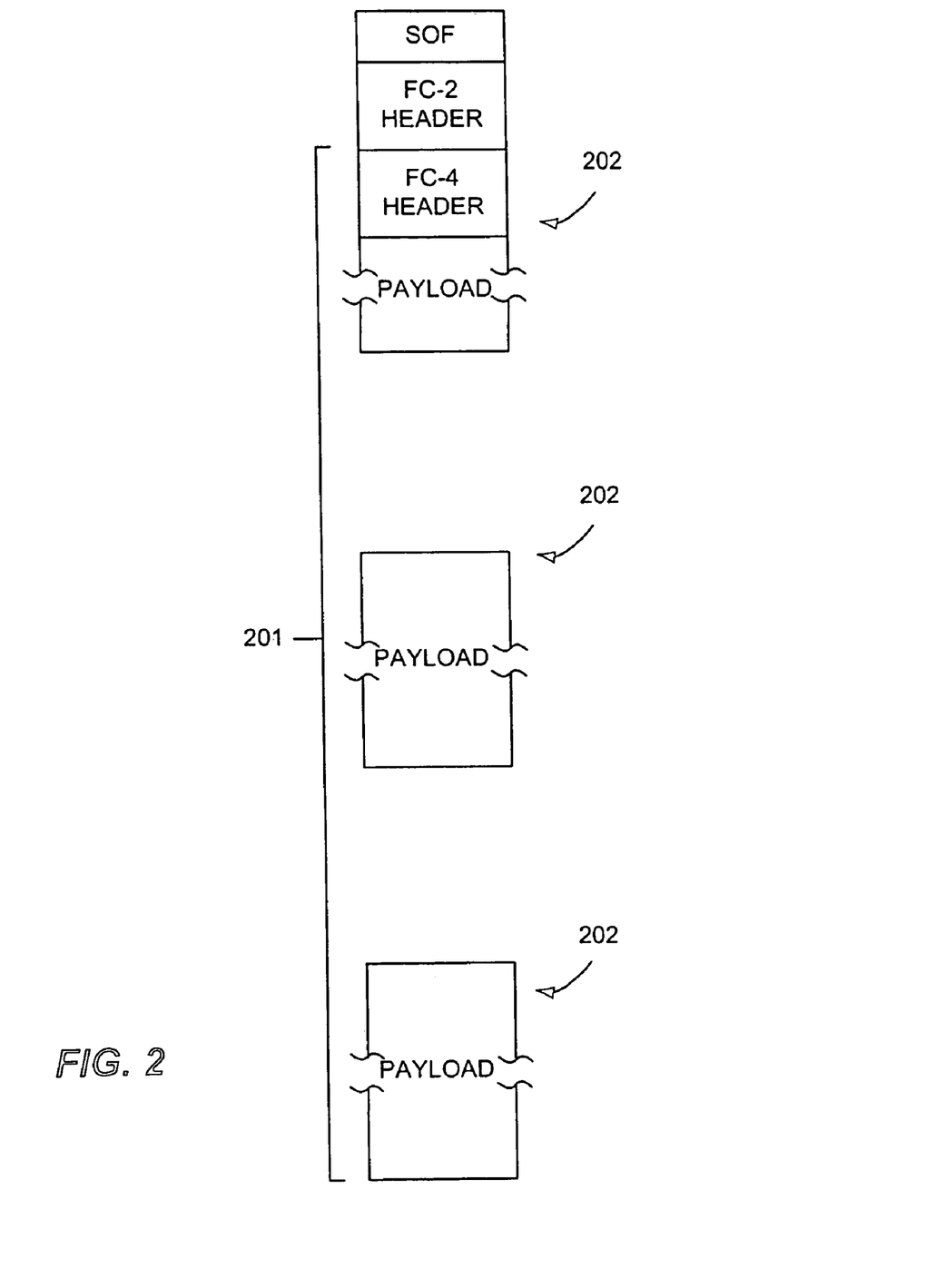
FIG. 2 illustrates in a description of an information unit in accordance with the present invention.

The present invention uses a concept of an "information unit" that is the basic unit of information exchange between a mainframe 102 and port control 107. An information unit has many characteristics of a data frame or data packet, but is embedded in the payload portion of another transport packet such as a fibre channel FC-4 packet. FIG. 2 illustrates an exemplary information unit 201 in accordance with the present invention. Each information unit 201 comprises one or more frames 202 that are implemented, for example, as FC-2 frames. FC-2 frames 202 are generally delineated by a start of frame (SOF) character and end of frame (EOF) character. Each FC-2 frame comprises a multi-byte FC-2 frame header, an optional FC-4 header and payload or data field as well as a cyclical redundancy check (CRC) field (not shown).

Mainframe 102 in cooperation with bridge device 107 manages a plurality of exchanges where each exchange corresponds to one SBCON link. The corresponding SBCON link is specified in the FC-4 header of the received FC frame 202. Each exchange is bound to a specified SBCON link for the duration of the exchange. The SBCON link is determined or specified by software running on mainframe 102 shown in FIG. 1. Mainframe 102 creates a binding between the SBCON link and an "exchange ID" such that all further communication destined for that SBCON link is tagged with the exchange ID. The exchange ID is essentially a binary value that uniquely identifies each open exchange. For example, if a total of 8 exchanges can be open at one time, the binary values "000" through "111" can be used to uniquely identify each exchange. Other numbering systems for selecting exchange ID's will be apparent and can be equivalently substituted so long as each command specifies a particular SBCON link.

The binding between an exchange and the specified SBCON channel is also used and maintained by bridge unit 107. Each information unit 201 belongs to a particular exchange as indicated by the exchange ID value in each FC-2 header of each frame 202. Bridge device 107 translates received FC-2 frames into SBCON frames and uses the exchange ID value to transfer the SBCON frames to the appropriate SBCON control unit 103.

Switch 108 creates and manages individual point-to-point links with each SBCON port 106 in director 105. Although only a few links are indicated in FIG. 1, a typical director 105 can manage links between any port 106 and any other port 106 (of up to 248 or more ports 106). Once an FC frame is received and validated, the frame is checked to determine if the frame is associated with a previously established exchange or, alternatively, whether a new exchange is being created. For new exchanges, port controller 107 generates an SBCON connection request to switch 108. The SBCON connection request includes information extracted from the FC-4 header that enables the matrix switch unit 108 to follow SBCON protocols to establish a connection between the channel and a particular SBCON control unit 103. Switch 108 returns a response code indicating whether a connection was established, or indicating the condition, if any, that prevented a connection (e.g., a busy or reject condition). Once a connection is established, port control 107 translates the received frames into SBCON frames that are transferred to the specified SBCON interface unit for the duration of the exchange.

Figure 3A:
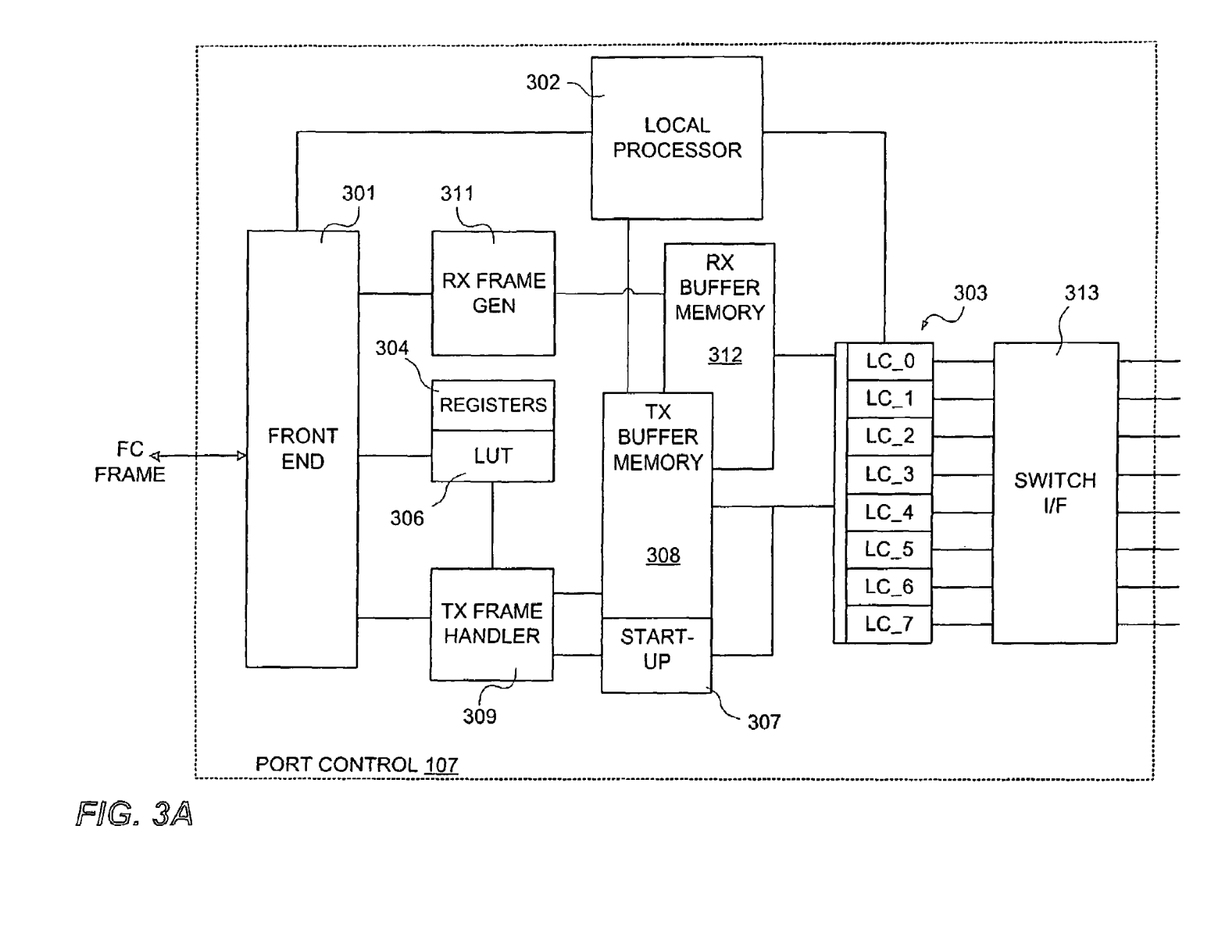
FIG. 3A illustrates in block diagram form a port controller in accordance with a specific implementation of the present invention.

FIG. 3A illustrates in block diagram form a port control 107 in accordance with a specific implementation of the present invention. Front end unit 301 implements FC-0 physical and FC-1 transport functionality in an essentially conventional standard-compliant manner. To aide understanding, the description of present invention is referenced to the mainframe 102 (shown in FIG. 1) so that frames and pathways designated with a "TX" refer to transmission from mainframe 102 and the designation "RX" is applied to frames and pathways related to data directed to mainframe 102. Front end unit 301 processes FC-2 frames using TX frame handler 309 that are coupled either to local processor 302 or one of link controllers 303 (labeled LC_0 through LC_7 in FIG. 3). Front end unit 301 also receives FC-2 frames originating from either local processor 302 or one of link controllers 303 via RX frame generator 311.

Local processor 302 includes mechanisms to control the FC-standard primitive sequences on the FC link. Primitive sequence processing is substantially specified by FC-standards and need not be understood in great detail for a complete understanding of the present invention. Reference to published fibre channel standards is appropriate for a greater understanding of these techniques. For purposes of the present invention it is sufficient to note that the front end unit 301 in cooperation with local processor 302 operate to sequence the FC link up to an "active" state before any data containing FC frames are passed on.

With respect to TX frames (i.e., frames received from mainframe 102), any FC frame other than a valid FC-4 data or FC-4 link frame is forwarded to the local processor 302. This includes all FC-2 frames as determined by the routing control (R_CTL) bits in the FC-2 frame header and any frame with a SOF field other than a Class 3 delimiter (i.e., delimiter type set to "SOFi3" or "SOFn3"). Port control 107 handles received frames differently depending on whether the frame is destined for local processor 302 or one of the link controllers 303. Specifically, any frame destined for local processor 302 is processed on a frame-by-frame basis whereas frames destined for a link controller 303 are handled on a sequence boundary (i.e., information unit) basis.

Port control 107 includes a number of registers 304 for storing various data. Some of registers 304 are global in that the data contained therein pertains to the port controller itself or to all of the link controllers 303, while other registers correspond to specific ones of link controllers 303. In the preferred implementation, the RX path is implemented by allocating a unique range of exchange ID (OX_ID) numbers and sequence ID (SEQ_ID) values to each link controller 303 and that range is stored in registers 304. Also, the registers 304 are used to store the port controller's address and a group base address, the significance of which is described hereinafter. A number of values are stored in registers 304 that are used in the process of generating FC-2 frames for RX data (i.e., data outbound to fabric 101. Any number and size of registers 304 may be provided to meet the needs of a particular application.

In operation, front end 301 performs address validation on TX frames by checking whether the destination identification (D_ID) matches the port controller's stored address field and whether the frame's source identification (S_ID) matches the port controller's stored group base address value. If the frame fails this address validation step the frame is forwarded to the local processor. After address validation, port control 107 may perform other frame validation checks based on information in the FC-2 header fields.

Port controller 107 also includes a look-up table (LUT) 306. LUT 306 (shown in greater detail in FIG. 6) includes a slot for every open exchange with each slot holding a plurality of fields. In the preferred implementation LUT 306 is indexed for TX frames by an OX_ID field corresponding to a particular open exchange. In the preferred implementation LUT 306 is indexed for RX frames by the link controller number (i.e., LC_0 through LC_7). In this manner, exchange-specific data can be stored, maintained, and retrieved from LUT 306.

As shown in FIG. 3A, controller 107 includes a TX buffer memory 308 and an RX buffer memory 312. Each buffer 308 and 312 includes a plurality of locations (i.e., lines, entries, slots). Each location is alternatively referred to as a buffer descriptor. Each buffer descriptor is sized to hold an information unit. In a particular example, RX buffer memory 312 includes thirty buffer descriptors. In a particular example TX buffer memory 308 also includes thirty buffer descriptors, a portion of which are allocated as "cut-through" descriptors and another portion of which are allocated as "start up" descriptors 307.

An important function of port control 107 is to bind frames to a particular link controller 303 and to direct frames to the bound link controller 303. Before an exchange binding is established, a new frame presented by front end unit 301 must be stored or buffered while an exchange binding is determined. Start-up buffer 307 provides this interim storage. Preferably the present invention is implemented so that mainframe 102 cannot send multiple frames with the same exchange ID until an exchange binding is established. Start up buffer descriptors 307 should be large enough to store at least one full frame for each open exchange, or eight frames in the particular example of FIG. 3A. Smaller startup buffers are possible in some applications where it is unlikely to be setting up multiple exchange bindings simultaneously.

Each FC frame includes information in its flow control (F_CTL) field in the FC-2 header indicating whether it is a first frame of a sequence, an intermediate frame in a sequence, or a last frame in a sequence. As used herein, a sequence corresponds to an information unit 201 shown in FIG. 2. For each TX frame, TX handler 309 copies the exchange ID field (OX_ID) from the FC-2 header and queries LUT 306 to determine if an exchange binding is already established and "open" for this frame (absent any error conditions described hereinbelow). Upon receiving such an indication, TX handler 309 will index LUT 306 using the OX_ID of the new frame and checked to determine if an exchange for that OX_ID is currently open or active.

Initially, an exchange binding will not exist. The first frame of a new exchange is stored in the startup descriptor area 307. Frame handler 309 performs operations to create a new exchange binding in LUT 306 in response to receiving an FC frame indicating it is the first frame in an exchange. When front end 301 encounters a frame indicating that it is the first frame in an exchange, it looks for the FC-4 header which includes exchange-specific control data.

Figure 3B:
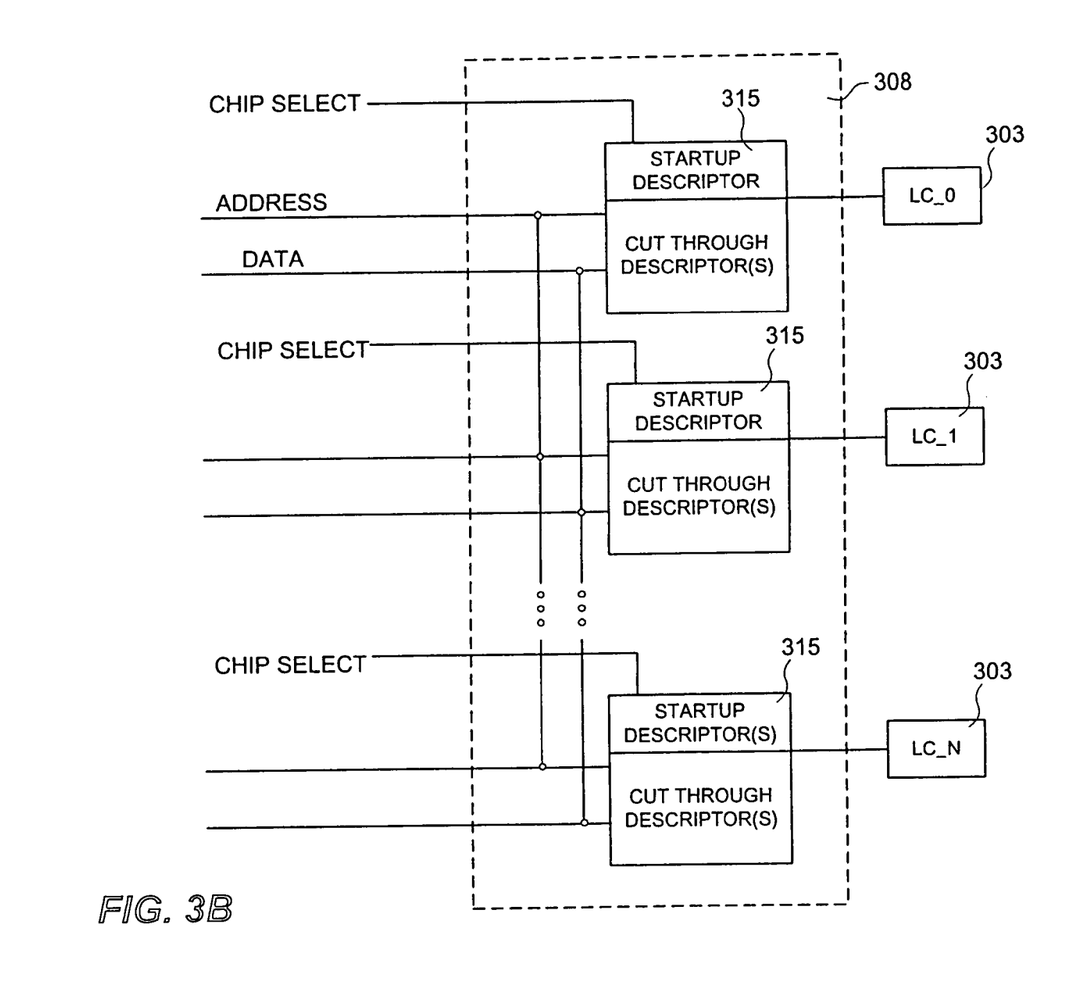
FIG. 3B illustrates in block diagram form a portion of port controller shown in FIG. 3A in accordance with a specific implementation of the present invention.

FIG. 3B shows a specific implementation of a memory structure used to implement TX buffer memories 308 and startup descriptor area 307. In the implementation of FIG. 3B, a plurality of memory chips 315 are configured such that each chip is associated with a particular link controller 303. Chip select signals selectively activate a particular memory. Memory chips 315 share a common address bus and data bus. The address signal provided on the address bus indicates a particular location within each chip 315.

In the preferred implementation, longitudinal redundancy check (LRC) codes associated with the FC-4 header are checked. If the LRC check passes, the SBCON link address is extracted from the FC-4 header and TX handler 309 makes an SBCON connection request to switch 108 (shown in FIG. 1) using the extracted SBCON link address, the stored group port address, and group port number. Switch 108 processes the request and returns a response code indicating that either that the connection has been established or has been denied. Part of the switch response identifies the particular link controller 303 to be used for the new exchange, preferably in the lower three bits of the source number returned by switch 108. Port control 107 then updates the entry in LUT 306 for the OX_ID corresponding to the received frame's OX_ID to indicate that the exchange is active and stores the returned link controller ID in that OX_ID slot of LUT 306 thereby "binding" the LC identification to this OX_ID.

When a startup frame is received, all chip select lines are active so that the startup frame is written into the same startup descriptor area 307 of each chip 315. Once a bind is determined for this particular exchange to link controller 303, indication of the specific startup descriptor is given to that link controller. In this manner the initial frame is forwarded to the proper link controller 303 associated with the exchange. The initial frame of the exchange is then forwarded from the startup descriptor 307 to the bound link controller 303. The result of a binding process is that a particular link controller 303 is associated with the exchange, and a particular TX buffer memory descriptor 308 (also called a "start-up" descriptor) is associated with the specific link controller 303. For intermediate and final frames in a sequence, the FC-2 header information is not needed as it will match the FC-2 header information of the first frame in the exchange. Intermediate and final frames are directed into their assigned cut-through descriptor 308 rather than the startup descriptor 307 used for the initial frame. The cut-through descriptors operate as a circular list. A existing exchange binding is used for intermediate frames, and an existing exchange binding is closed or removed when the F_CTL field indicates an end of exchange.

As noted above, in the preferred implementation CRC checks are performed on the complete FC-2 frame before frames are processed. Any CRC errors, which usually indicate some kind of transmission error, should be reported through one of the registers 304. For intial frames, CRC checking is preferably performed before the bind request processing is started so that the CRC error will be detected before the processes to create a new exchange binding have begun. If a new exchange binding is created before the CRC error is detected then local processor 302 should be notified by an interrupt code causing local processor 302 to run an error handling procedure. Desirably, the D_ID value used for the matrix controller connection request is retained until the CRC is validated. Any frame having a CRC error is desirably discarded.

Figure 4:
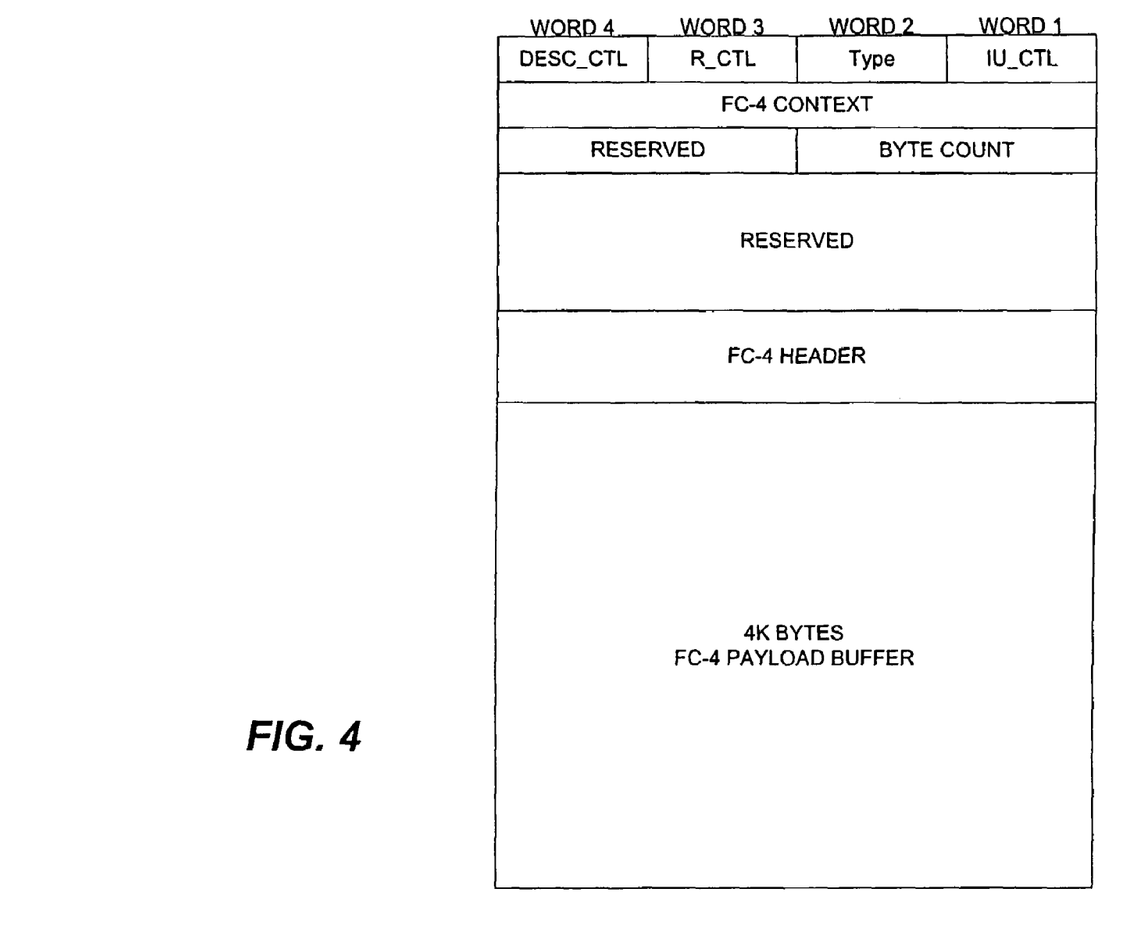
FIG. 4 shows a first data structure used in an implementation in accordance with the present invention.

Each link controller 303 include memory in which a number of TX buffer descriptors and RX buffer descriptors are implemented. The TX buffer descriptors hold control and payload data necessary to form SBCON frames. Similarly, RX buffer descriptors hold control and payload data necessary to form FC frames. A single RX/TX buffer descriptor format, shown in FIG. 4, is used in the preferred implementation. The descriptor format shown in FIG. 4 indicates a specific word organization to ease understanding, however, it should be understood that a RX/TX buffer descriptor can vary significantly from the size, organization, and relative proportions shown in FIG. 4 without departing from the teachings of the present invention.

Control information held in the TX/RX buffer descriptors 308 and 312 includes descriptor control (DESC_CTL), routing control (R_CTL), and information unit control (IU_CTL) that indicates whether the IU is an initial, intermediate or last information units within an exchange. The descriptor control field is used to hold values indicating, for example, ownership of the descriptor, state information, and other descriptor-specific management values. The routing control field and Type fields are copied from the FC-2 header of the corresponding FC frames. The IU_CTL field is analogous to the frame control (F_CTL) field of a conventional FC-2 header but only includes values that pertain to an "information unit" rather than an FC frame. A byte count field holds a value indicating the number of bytes in the payload buffer portion, thereby enabling varying size frames to accommodate efficient transport of data.

The FC-4 header field is copied in its entirety to the RX/TX buffer descriptor and the remaining region is allotted for FC-4 payload data. It should be noted that standard FC frames have a payload maximum size of about 2K Byte while standard SBCON frames have a maximum payload size of about 1K Byte. Accordingly, each buffer descriptor may hold enough payload data for multiple SBCON frames or FC frames. Port controller 107 is responsible for segmenting the sequence into a proper number of frames. Preferably, each frame except for an end of sequence frame is a maximum length FC frame.

During frame processing the various fields in the TX buffer descriptor and RX buffer descriptor are filled with payload and header data. TX frame handler 309 functions to place frames in TX buffer memory 308. Link controllers 303 uses the data from the TX buffer descriptors 308 to generate SBCON frames for transmission to the switch interface 313. RX frame generator 311 uses the data from the RX buffer descriptors 312 to generate FC frames for transmission to front end 301.

It is contemplated that a typical exchange will comprise multiple information units. Likewise, many information units or sequences will involve multiple FC frames. Each FC frame includes an amount of payload data that is eventually transferred into an information field of one or more SBCON frames, but there often will not be a 1:1 correspondence between FC frames and SBCON frames. Also, for multiframe sequences only the payload portion of the subsequent frames of the sequence are written to the information field of the description. Duplicative information in the FC-2 header of subsequent frames is not copied. Hence, the amount of data actually copied to the TX buffer descriptors differs from the actual amount of data in the corresponding FC-2 frames.

For multi-frame sequences port controller 107 maintains a byte count of "actual" FC-4 payload across the entire sequence. "Actual FC-4 payload" refers to the portion of the payload that will actually be copied into the SBCON information fields and so does not count header information in the FC-4 frames. This actual payload value is supplied in the SBCON frame so that the link controller can respond accordingly. Port controller 107 is responsible for the detection of multi-frame sequences and maintaining a write pointer within memory structures of each link controller 303 for the subsequent frames. Additionally, the Type field, R_CTL field of the FC-2 header are included as part of the descriptor information. When the complete sequence has been copied to the TX buffer descriptor(s), port control unit 107 changes the ownership of the complete descriptor(s) to the associated link controller and adjusts its pointer to the next TX buffer descriptor for assembling and processing the next frame for the current exchange binding.

When port control unit 107 receives a new sequence it should verify that it owns the cut-through buffer descriptor before using it. If the port control unit 107 does not own the buffer descriptor (e.g., ownership has already been transferred to a link controller 303) and a new sequence is received then an overrun condition exists and should be indicated in error status registers of registers 304. Port control unit 107 should generate a missing sequence error code in response to all subsequent sequences on that exchange.

For RX frame (i.e., outbound to fabric 101) processing, the port controller 107 has responsibility for creating and transmitting an FC-2 frame from RX buffer descriptors created by each link controller 303 or by local processor 302. Port controller 107 includes some global registers within registers 304 as well as a set of registers for each link controller 303 that aid in creation of the FC-2 header. Global registers include a register for storing the port controller's address and group base address which, as indicated hereinbefore, are used for the S_ID and D_ID of the FC-2 header. Global registers also include registers for holding error status, and global parameters such as maximum frame size and the like.

An important function for RX frame processing is to manage assignment of OX_IDs and sequence numbering for frames originated by an SBCON control unit 103. A link controller-specific register is used to hold an OX_ID value that represents the starting OX_ID for this link controller 303. Another link controller-specific register is used to hold a value that represents the number of OX_IDs for this link controller 303. Other registers hold a starting sequence ID value and a value indicating the maximum number of sequences for the associated link controller. Other registers may be used to meet the needs of a particular application.

The remainder of the FC-2 header is created from the R_CTL, and information unit control (IU_CTL) fields of the RX buffer descriptor. The IU_CTL is used to generate the upper byte of the F_CTL and indicates whether an IU is the first IU in an exchange or a last IU in an exchange. Once an exchange binding is created it is the responsibility of port controller 107 to create the F_CTL bits and delimiter types for the FC-2 SOF field that identify sequences for the duration of the exchange. The SEQ_CNT value for each link controller is stored in one of registers 304 and is implemented as a free-running counter that increments with each frame sent in the preferred implementation. The SEQ_CNT value is reset to zero at the end of a sequence such that each sequence starts with SEQ_CNT=0. In this manner, an error condition (e.g., a missing frame) can be detected when frames arrive that indicate a SEQ_CNT that is not equal to zero but otherwise appear as the first frame of a sequence.

As an LC 303 completes an FC-4 sequence it passes ownership of the associated RX descriptor to port controller 107 to indicate the IU is ready. The RX descriptors in RX buffer memory 312 are polled in a round robin fashion to identify IUs that are ready to send. Each time an IU that is ready is identified, the buffer descriptor ownership bits are verified and the buffer descriptor byte count value is read. FC-2 header information is read and an FC-2 frame is created by frame generator 311 for transmission on the FC link. When the frame generator 311 has completed the sequence port controller 107 and changes the ownership of that descriptor back to the link controller 303.

Figure 5:
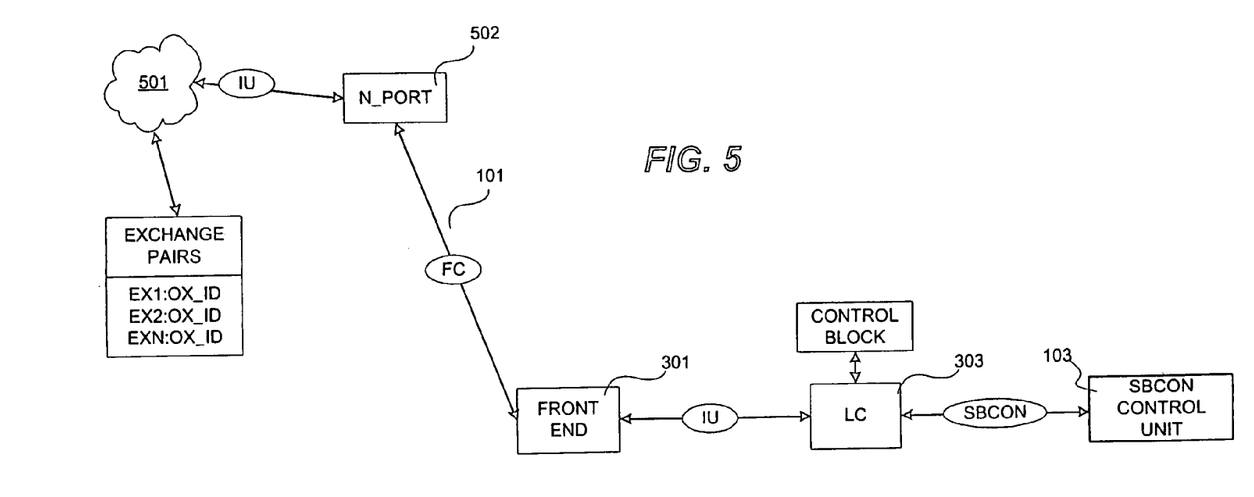
FIG. 5 shows a data flow diagram illustrating operation of the mechanisms and methods in accordance with the present invention.

FIG. 5 shows a data flow diagram illustrating operation of the mechanisms and methods in accordance with the present invention. A software application 501 executes on mainframe 102 shown in FIG. 1. Software application 501 generates an information unit (labeled "IU") that is sent to an N_Port 502 associated or integrated with mainframe 102. Software application 501 assigns an originator exchange identification (OX_ID). This OX_ID is assigned in a conventional manner so that a unique OX_ID value is selected to identify a given exchange, and all information units that participate in that exchange are tagged with the assigned OX_ID. Any mechanism may be used to assign the OX_ID including simple sequential assignment.

Figure 6:
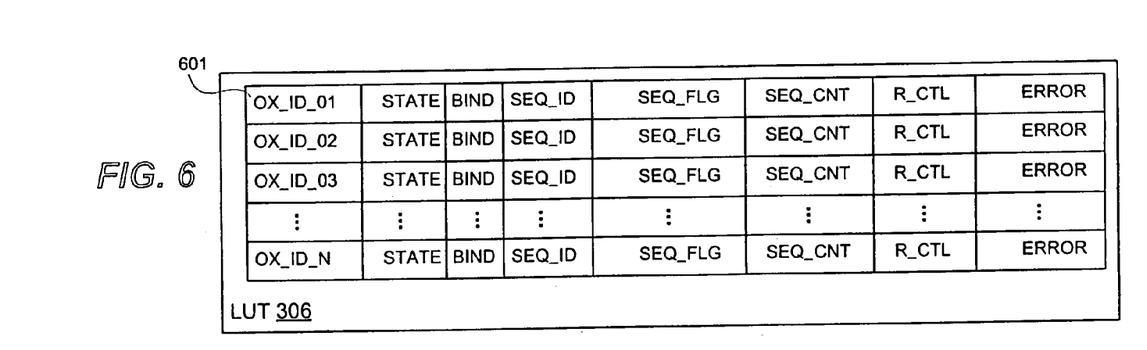
FIG. 6 illustrates a second data structure used in an implementation in accordance with the present invention.

The IU is transported in an FC frame in a conventional manner and forwarded to the port controller front end 301. Front end 301 strips off the FC-2 header information to recreate the information unit. The information unit is then forwarded to the appropriate link controller, which is determined according to the exchange binding methodology described hereinbefore. For new frames, receiving link controller 303 generates a "control block" which comprises information from the FC-2 header needed to create a response frame to the mainframe 102. The control block is stored as field in LUT 306 in the particular examples. One or more SBCON frames are generated and sent to SBCON control unit 103.

Typically, the SBCON control unit will generate a response frame such as an ACCEPT that is transmitted back to the port control unit 107. The S_ID of the received SBCON packet is set to the group base address. Because a circuit connection between the SBCON control unit and the particular link controller 303 remains established for the duration of the exchange, the SBCON response is received by the correct link controller 303.

The link controller reformats the SBCON frame into an information unit using the stored framing data in the earlier saved control block. The link controller 303 includes an indication to the front end unit 301 as to whether the frame participating in an open exchange or if a new exchange needs to be created. For new exchanges, the link controller assigns an OX_ID value from its allotted range. For existing exchanges, the information unit is tagged with the unique OX_ID value that identifies this exchange. Front end unit 301 creates an FC-2 frame that is sent back to mainframe 102 through fabric 101.

Software application 501 makes a determination based off of the OX-ID value stored in the FC-2 header of the received frame whether this frame is related to an earlier issued information unit bearing the same OX-ID. At this point, an exchange pair is open and packets can be sent back and forth across fabric 101 and received in order by SBCON control unit 103. The exchange pair remains open until both the outbound and inbound exchanges are terminated either expressly or implicitly by error or time out conditions.

Importantly, the software application 501 can establish multiple simultaneous exchanges and thereby send other packets to other SBCON connections while awaiting a response for the first SBCON connection. Accordingly, up to eight or perhaps more exchanges can be simultaneously open with each exchange feeding data to an independent 200 Mbit per second channel. From the node port's perspective, a single exchange is opened between itself and the front end unit 301 and all packets are addressed to that exchange.

FIG. 6 illustrates a simplified structure for LUT 306. LUT 306 may be implemented as a logical table data structure or a content addressable memory structure indexed by the OX_ID entry. Each slot 601 includes a plurality of entries or fields. State information indicates whether the associated exchange is closed, open (i.e., a request is pending to matrix switch unit 108) and active (i.e., a bind has been established). The "bind" field holds a group member identification indicating the particular link controller 303 that is bound to this exchange. The SEQ_ID field holds the FC-2 sequence ID from the last frame received on this exchange. The SEQ_FLG field indicates whether a sequence on this exchange is active or terminated. For multi-frame sequences the SEQ_CNT field indicates whether this is the last FC-2 sequence count received and the R_CTL field holds the information category field of the FC-2 R_CTL from the first frame of the sequence. The error field indicates whether an error has been detected on the current sequence, and may hold an encoded value indicating the type of error.

In a particular implementation, during initialization or boot up local processor 302 performs a status check on the link controllers in port controller 107 to determine their operational state. A particular port controller 107 may have fewer than eight LCs 303 installed, or one or more of LCs 303 may be non-operational for a variety of reasons. In the particular implementation one open exchange is allotted for each operational link controller 303, or a maximum of eight in the example of FIG. 3A. Local processor 302 generates an FC-4 bridge control frame to indicate the number of open exchanges pairs allowed.

Mainframe 102 (shown in FIG. 1) cannot send any packets to an exchange until it has received these exchange credits from port controller 107. In other words, port controller 107 will reject any packets sent with an OX_ID corresponding to an exchange that is closed. When sending a packet that requires a new exchange be established, mainframe 102 gives up an exchange credit. Once mainframe 102 has given up all its exchange credits, it cannot send messages to any new exchanges until an existing exchange closes. Upon an exchange being closed, port controller 107 generates an FC-4 bridge control message giving mainframe 102 exchange credit(s) corresponding to the now closed exchange.

It is contemplated that the exchange credits can be determined dynamically at run time as well as at initialization. Local processor 302 can bring down or deactivate a local controller 303 by sending another FC-4 bridge control frame to mainframe 102 removing the exchange credits for that particular link controller.

During operation, the preferred implementation requires that the channel cannot send frames to an OX_ID until it has received an acknowledgement that the initial frame of that sequence is received and that an exchange has been established. This feature avoids over-running the TX descriptor buffer at start up. If the channel were allowed to send multiple messages to the same exchange number (using the same OX_ID) the frame rate could be faster than port controller 107 could process them.

A synchronization point should be made on all new outbound exchanges between the mainframe and the link controller 303 that is bound to that exchange. This is desired regardless of the context of the outbound exchange, i.e., solicited vs. Unsolicited or any "ship passing" scenarios. This requirement is due to the latency associated with processing a new outbound exchange. There is no other mechanism to indicate back to the mainframe 102 that the bind between the OX_ID and a link controller 303 has been made. Until the bind is established for that OX_ID by port controller 107 the delivery of any subsequent sequences on that OX_ID cannot be guaranteed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for managing a data connection comprising the steps of:
    generating a first message including an exchange identification field holding a value that uniquely identifies a logical exchange to which the message belongs;
    encoding the first message into a first datagram, the first datagram including meta-data for use by a packet switched link;
    transporting the datagram over a packet switched link;
    receiving the datagram from the packet switched link in an intermediate data transport mechanism coupled to the link;
    storing the meta-data in the intermediate data transport mechanism;
    re-encoding the first message into a second datagram, the second datagram including meta-data for use by a circuit switched link; and
    transporting the second datagram over a circuit switched link.

2. The method of claim 1 further comprising the steps of:
    receiving the second datagram from the circuit switched link;
    generating a second message in response to the second datagram;
    encoding the second message into a third datagram including meta-data for use by the circuit switched link;
    transporting the third datagram over the circuit switched link to the intermediate data transport mechanism; and
    re-encoding the second message into a fourth datagram, the fourth datagram including meta-data copied from the stored meta-data for use by the packet switched link.

3. The method of claim 1 further comprising:
    after receiving the first datagram from the packet switched link in the intermediate data transport mechanism, binding the exchange identification value to a particular circuit switched link for the duration of the logical exchange.

4. A bridge circuit for a communication link comprising:
    a packet switched side supporting a full duplex packet switched link;
    a circuit switched side supporting a number of full duplex circuit switched links;
    a binding mechanism within the bridge circuit having a storage space for storing a logical binding description binding packet switched frames to a particular one of the circuit switched links, wherein the bridge circuit identifies a logical exchange indicated in packet-switched frames received on the packet switched link and maintains the logical binding throughout the duration of the logical exchange, and the bridge circuit further maintains the status of the logical exchange as open, active, or closed.

5. The bridge circuit of claim 4 wherein the binding mechanism further comprises:
    a storage structure holding selected header information from received packet switched frames;
    a frame generator for reformatting received circuit switched frames into packet switched frames using the stored header information.

6. A method for operating a communication link comprising the steps of:
    providing a bridge unit supporting a high bandwidth connection and a plurality of low bandwidth connections;

verifying operability of the low bandwidth connections;

determining an exchange credit value based on the number of operable low bandwidth connections;

issuing a message including the credit value on the high bandwidth connection;

requiring any device coupled to the high bandwidth connection to have at least one exchange credit before communications will be accepted by the bridge unit on the high bandwidth connection from that device.

7. The method of claim 6 wherein the validation is performed during initialization of the bridge circuit.

8. The method of claim 6 wherein the validation is performed dynamically at runtime.

9. The method of claim 6 further comprising:

receiving a message in the bridge unit from a device coupled to the high bandwidth connection, the message having an exchange credit and an exchange identifier;

opening a logical exchange by binding the exchange identifier to a selected one of the low bandwidth connections;

routing subsequent messages received by the bridge unit that have the same exchange identifier to the low bandwidth connection that is bound to that exchange identifier.

* * * * *

UNITED STATES PATENT AND TRADEMARK OFFICE
CERTIFICATE OF CORRECTION

PATENT NO. : 6,975,623 B2  Page 1 of 1
APPLICATION NO. : 10/798818
DATED : December 13, 2005
INVENTOR(S) : Jeffrey J. Nelson et al.

It is certified that error appears in the above-identified patent and that said Letters Patent is hereby corrected as shown below:

Title Pg, Item (75) Inventors: delete "Broomfield" and insert --Niwot--, therefor.

Column 2, line 27, before "extensible," delete "a" and insert --an--, therefor.

Column 2, line 57, delete "it's" and insert --its--, therefor.

Column 9, line 30, before "existing" delete "A" and insert --An--, therefor.

Column 9, line 38, delete "intial" and insert --initial--, therefor.

Column 12, line 38, delete "OX-ID" and insert --OX_ID--, therefor.

Column 12, line 40, delete "OX-ID" and insert --OX_ID--, therefor.

Column 13, line 3, delete "R CTL" and insert --R_CTL--, therefor.

Column 13, line 53, delete "Unsolicited" and insert --unsolicited--, therefor.

Signed and Sealed this

Nineteenth Day of January, 2010

David J. Kappos
*Director of the United States Patent and Trademark Office*